United States Patent
Nakagawa et al.

(10) Patent No.: US 11,757,554 B2
(45) Date of Patent: Sep. 12, 2023

(54) OPTICAL BRANCH INSERTION DEVICE AND OPTICAL TRANSMISSION SYSTEM USING OPTICAL BRANCH INSERTION DEVICE

(71) Applicant: Nippon Telegraph and Telephone Corporation, Tokyo (JP)

(72) Inventors: Masahiro Nakagawa, Musashino (JP); Kana Masumoto, Musashino (JP); Hidetoshi Onda, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 113 days.

(21) Appl. No.: 17/437,510

(22) PCT Filed: Mar. 12, 2020

(86) PCT No.: PCT/JP2020/010928
§ 371 (c)(1),
(2) Date: Sep. 9, 2021

(87) PCT Pub. No.: WO2020/195912
PCT Pub. Date: Oct. 1, 2020

(65) Prior Publication Data
US 2022/0182169 A1 Jun. 9, 2022

(30) Foreign Application Priority Data
Mar. 26, 2019 (JP) .................. 2019-057567

(51) Int. Cl.
*H04J 14/02* (2006.01)
(52) U.S. Cl.
CPC ............... *H04J 14/0212* (2013.01)
(58) Field of Classification Search
CPC .............. H04J 14/0212; H04B 10/27
See application file for complete search history.

(56) References Cited

U.S. PATENT DOCUMENTS

| | | | | |
|---|---|---|---|---|
| 6,222,653 B1 * | 4/2001 | Asahi | .................. | H04J 14/0297 398/4 |
| 7,181,095 B1 * | 2/2007 | Meli | ..................... | H04J 14/021 385/11 |
| 7,460,744 B2 * | 12/2008 | Nakagawa | .......... | H04J 14/0238 398/59 |

(Continued)

FOREIGN PATENT DOCUMENTS

| | | | | |
|---|---|---|---|---|
| EP | 2063562 A1 * | 5/2009 | .......... | H04J 14/0204 |
| EP | 2403172 A2 * | 1/2012 | .......... | H04J 14/0204 |

(Continued)

OTHER PUBLICATIONS

Sakamaki et al., "Optical switch technology that realizes a more flexible optical node," NTT Technology Journal, 2013, 25(11):16-20, 11 pages (with English translation).

*Primary Examiner* — Tanya T Motsinger
(74) *Attorney, Agent, or Firm* — Fish & Richardson P.C.

(57) ABSTRACT

Device cost and electric power consumption are reduced. Nodes 11a to 11d as optical add/drop multiplexers each include AWGs 24a and 24b connected between light transmission paths as optical fibers 12 and 13 and transponders 25a to 25n and configured to output optical signals from the light transmission paths to the transponders 25a to 25n through ports and transmit optical signals from the transponders 25a to 25n to the light transmission paths through ports, and an optical coupler 24c configured to connect ports of the AWGs 24a and 24b to the transponders 25a to 25n through coupling or bifurcation. The channel interval of ports of the AWGs 24a and 24b is multiple times larger than the channel interval of ports of the transponders 25a to 25n, and transponder signals of a plurality of different wavelengths to and from one or a plurality of the transponders 25a to 25n can pass through ports of the AWGs 24a and 24b.

10 Claims, 12 Drawing Sheets

(56) References Cited

U.S. PATENT DOCUMENTS

| | | | | |
|---|---|---|---|---|
| 10,771,180 B1* | 9/2020 | Schmogrow | H04J 14/0206 |
| 2003/0091274 A1* | 5/2003 | Vohra | H04J 14/0228 |
| | | | 385/24 |
| 2004/0067006 A1* | 4/2004 | Welch | H01S 5/4031 |
| | | | 385/14 |
| 2005/0117902 A1* | 6/2005 | Le Sauze | H04Q 11/0005 |
| | | | 398/45 |
| 2005/0281558 A1* | 12/2005 | Wang | H04J 14/0209 |
| | | | 398/85 |
| 2006/0098981 A1* | 5/2006 | Miura | H04Q 11/0005 |
| | | | 398/45 |
| 2009/0274459 A1* | 11/2009 | Takita | H04Q 11/0005 |
| | | | 398/48 |
| 2011/0158654 A1* | 6/2011 | Zhang | H04J 14/0282 |
| | | | 375/283 |
| 2012/0114332 A1* | 5/2012 | Zhang | H04J 14/0212 |
| | | | 398/48 |
| 2014/0147121 A1* | 5/2014 | Matsukawa | H04J 14/0206 |
| | | | 398/83 |
| 2015/0256283 A1* | 9/2015 | Takahashi | H04Q 11/0005 |
| | | | 398/48 |
| 2017/0099099 A1* | 4/2017 | Papakos | H04B 10/0773 |
| 2017/0222747 A1* | 8/2017 | Ban | H04J 14/0283 |
| 2017/0310574 A1* | 10/2017 | Wolting | H04L 49/70 |
| 2018/0076918 A1* | 3/2018 | Boduch | H04B 10/506 |
| 2018/0143508 A1* | 5/2018 | Uetsuka | G02F 1/31 |
| 2019/0058526 A1* | 2/2019 | Matsuyama | H04B 10/27 |
| 2022/0149968 A1* | 5/2022 | Nakagawa | H04J 14/0201 |
| 2022/0182167 A1* | 6/2022 | Kawahara | H04B 10/27 |
| 2022/0303014 A1* | 9/2022 | Mertz | H04B 10/532 |
| 2023/0104943 A1* | 4/2023 | Salah | H04L 12/28 |
| | | | 398/66 |

FOREIGN PATENT DOCUMENTS

| | | | | |
|---|---|---|---|---|
| EP | 2615755 A1 * | 7/2013 | | H04J 14/0212 |
| EP | 2426841 B1 * | 1/2019 | | H04J 14/0204 |
| WO | WO 2014050064 | 4/2014 | | |
| WO | WO 2017150277 | 9/2017 | | |
| WO | WO-2022224298 A1 * | 10/2022 | | |

* cited by examiner

| LINK NUMBER / WAVELENGTH | #1 | #2 | #3 | #4 |
|---|---|---|---|---|
| λ1 | IN USE | AVAILABLE | AVAILABLE | AVAILABLE |
| λ2 | AVAILABLE | AVAILABLE | AVAILABLE | AVAILABLE |
| λ3 | AVAILABLE | AVAILABLE | IN USE | IN USE |
| λ4 | AVAILABLE | AVAILABLE | AVAILABLE | AVAILABLE |
| ⋮ | AVAILABLE | AVAILABLE | AVAILABLE | AVAILABLE |

OPTICAL BRANCH INSERTION DEVICE AND OPTICAL TRANSMISSION SYSTEM USING OPTICAL BRANCH INSERTION DEVICE

CROSS-REFERENCE TO RELATED APPLICATIONS

This application is a National Stage application under 35 U.S.C. § 371 of International Application No. PCT/JP2020/010928, having an International Filing Date of Mar. 12, 2020, which claims priority to Japanese Application Serial No. 2019-057567, filed on Mar. 26, 2019. The disclosure of the prior application is considered part of the disclosure of this application, and is incorporated in its entirety into this application.

TECHNICAL FIELD

The present invention relates to an optical add/drop multiplexer used for light wavelength multiplexing or wavelength division multiplexing (WDM) in a communication network and configured to drop and add an optical signal transmitted through an optical fiber, and a light transmission system using the optical add/drop multiplexer.

BACKGROUND ART

The connection form of a communication network has evolved from a point-to-point (P2P) connection form, a ring connection form, a multi-the ring connection form, and a mesh connection form. The P2P connection form is a form in which nodes as light transmission devices each configured to terminate communication data and relay the communication data to a communication terminal are oppositely connected with each other in a one-to-one state through an optical fiber. The ring connection form is a form in which a plurality of nodes are connected with one another in a ring shape through an optical fiber. The multi-the ring connection form is a form in which a plurality of rings in ring connection are connected with each other through nodes by optical fibers, and is included in mesh connection to be described later. The mesh connection form is a form in which nodes are connected in mesh with one another through optical fibers to perform mutual communication therebetween.

Development of an optical add/drop multiplexer (OADM) as a node is behind such network connection form evolution, and progress has been made in establishment of an economical photonic transport network and flexibility of operation thereof.

Examples of the optical add/drop multiplexer include a CDC (colorless, directionless, and contentionless)-ROADM (reconfigurable optical add/drop multiplexer) having high functionality with the three functions of a first function, a second function, and a third function to be described later. The CDC-ROADM enables remote reconstruction of an optical layer. The ROADM is a function to enable add/drop of an optical signal at each node. The CDC is a function (CDC function) to connect an optical signal added/dropped in a multi-path ROADM to a transponder (optical relay) without signal collision irrespective of a wavelength and a path.

A color-less function as the first function is a function with which an optical signal from a transponder can be output to the same path at an optional wavelength without change of physical wiring.

A direction-less function as the second function is a function with which an optical signal from a transponder can be output at an optional path without change of physical wiring.

A contention-less function as the third function is a function with which output to a path different from an existing path (existing transmission path) can be performed at the same wavelength from different transponders without change of physical wiring.

Examples of a light transmission system using such an optical add/drop multiplexer include a technology disclosed in Non-Patent Literature 1.

CITATION LIST

Non-Patent Literature

Non-Patent Literature 1: Youhei Sakamaki and two others, "Optical switch technology for achieving more flexible optical node", NTT technology journal 2013. 11.

SUMMARY OF THE INVENTION

Technical Problem

However, the CDC-ROADM used as the optical add/drop multiplexer described above uses a large number of active devices such as a multicast switch configured to perform switching when data is transferred from one transmission source to a plurality of destinations and an amplifier.

Price per bit increases when the CDC-ROADM, which is expensive due to use of such components, is used in an area having a small traffic amount. In addition, electric power consumption increases when a large number of amplifiers are used in the CDC-ROADM. In this manner, the optical add/drop multiplexer such as the CDC-ROADM uses a large number of active devices and amplifiers, and thus device cost and electric power consumption increase in exchange for the flexibility of network operation, which has been a problem.

The present invention is intended to solve the above-described problem and provide an optical add/drop multiplexer having reduced device cost and electric power consumption and a light transmission system using the optical add/drop multiplexer.

Means for Solving the Problem

As a solution to the above-described problem, an invention according to claim 1 is an optical add/drop multiplexer configured to drop or add an optical signal between the optical add/drop multiplexer and a transponder connected with a communication terminal, the optical signal being transmitted by wavelength division multiplexing to a light transmission path included in a communication network, the optical add/drop multiplexer includes an arrayed waveguide grating (AWG) connected between the light transmission path and the transponder and configured to output, from a port to the transponder, an optical signal transmitted through the light transmission path and transmit, through a port to the light transmission path, the optical signal transmitted from the transponder; an optical coupler configured to connect a plurality of ports of the AWG to the transponder through coupling or bifurcation, a channel interval of ports of the AWG is a plurality of times larger than a channel interval of ports of the transponder, and transponder signals as optical signals of a plurality of different wavelengths to and from one or a plurality of transponders can pass (or transmit) through ports of the AWG.

With this configuration, transponder signals of a plurality of different wavelengths can pass through a channel of the AWG. Thus, when the wavelength (for example, a wavelength $\lambda 1$) of a transponder signal from a transponder is changed to another wavelength $\lambda 2$, similarly to the transponder signal of the wavelength $\lambda 1$ before the change, the transponder signal of the wavelength $\lambda 2$ after the change can be transmitted to the same light transmission path through a port of the AWG. Accordingly, a transponder signal as an optical signal from a transponder can be output to the same path at a different wavelength without change of physical wiring between the optical add/drop multiplexer and the transponder device. Thus, the optical add/drop multiplexer of the present invention does not use, as an add/drop unit, an active device such as a multi cast switch or an amplifier configured to compensate light loss, which leads to reduction of device cost and electric power consumption.

An invention according to claim 2 is the optical add/drop multiplexer according to claim 1, further including an optical switch (SW) unit configured to transmit or cut off, when the light transmission path includes a different light transmission path, an optical signal between the different light transmission path and the AWG, and when the wavelength of a transponder signal is changed to a different wavelength by the transponder, the light SW unit transmits the transponder signal of the changed wavelength to the different light transmission path.

With this configuration, an optical signal from the transponder can be output through an optional path, in other words, a different path without change of physical wiring between the optical add/drop multiplexer and the transponder device.

An invention according to claim 3 is the optical add/drop multiplexer according to claim 2 in which when a plurality of the AWGs and a plurality of the transponders are provided, the light SW unit transmits, to different light transmission paths, optical signals including transponder signals having an identical wavelength, transmitted from different transponders, and having passed through different AWGs.

With this configuration, output to a path different from an existing path can be performed at the same wavelength from different transponders without change of physical wiring between the optical add/drop multiplexer and the transponder device.

An invention according to claim 4 is the optical add/drop multiplexer according to any one of claims 1 to 3, in which the optical coupler is an N×N optical coupler that includes ports connectable with a plurality of ports of the AWG and includes ports connectable with a plurality of the transponders.

With this configuration, for example, a 2×2 optical coupler as the N×N optical coupler can be connected with two transponders, and thus the number of transponders connectable with the AWG can be increased.

An invention according to claim 5 is the optical add/drop multiplexer according to any one of claims 1 to 3, further including, between the optical coupler and the transponder: an amplifier connected with the optical coupler; and a 1×N optical coupler that includes a port connected with the amplifier and includes ports connectable with a plurality of the transponders.

With this configuration, the 1×N optical coupler can be connected with N transponders, and thus the number of transponders connectable with the AWG can be increased. In this case, a signal loss through N drops at the 1×N optical coupler can be canceled through signal amplification at the amplifier.

An invention according to claim 6 is the optical add/drop multiplexer according to claim 2 or 3, in which the optical SW unit includes a wavelength selective switch (WSS) configured to perform multiplexing-demultiplexing of the wavelength of an optical signal transmitted to the light transmission path and path switching of the optical signal, and a pair of the AWG and an optical coupler are connected in parallel with the WSS.

With this configuration, since a pair of an AWG and an optical coupler can be additionally connected in parallel with a WSS, an additional transponder can be connected the additional pair of the AWG and the optical coupler. Thus, the number of connectable transponders can be increased.

An invention according to claim 7 is the optical add/drop multiplexer according to any one of claims 1 to 3, further including, between the optical coupler and the transponder: an amplifier connected with the optical coupler; and a 1×N optical coupler that includes a port connected with the amplifier and includes ports connectable with a plurality of the transponders, a multi carrier optical path transponder including a plurality of transmission ports and a plurality of reception ports is connected with N ports of the 1×N optical coupler, and a single carrier optical path transponder is connected with the optical coupler or a 1×N optical coupler.

With this configuration, a single carrier optical path and a multi carrier optical path can be provided in mixture. In this case, when a multi carrier optical signal in which optical signals having a plurality of kinds of wavelengths are superimposed is transmitted from the multi carrier optical path transponder, a signal having a larger number of wavelengths can be input to an identical AWG port, and thus large-volume data transmission can be performed through one path. An optical signal transmitted from the multi carrier optical path transponder connected with the N ports of the 1×N optical coupler may be divided into optical signals having a plurality of kinds of wavelengths, and the divided optical signals may be transmitted to different light transmission paths. In this case, the number of optical signals superimposed in one multi carrier optical signal is smaller, but data transmission can be performed through a plurality of systems when the transmission is performed through different light transmission paths.

An invention according to claim 8 is a light transmission system including: the optical add/drop multiplexer according to any one of claims 1 to 7; and a monitoring control device separately connected with the optical add/drop multiplexer and configured to instruct optical path generation control and wavelength change control to the optical add/drop multiplexer, and the optical add/drop multiplexer performs the instructed optical path generation control and wavelength change control to generate an optical path and change the wavelength of an optical signal in the optical add/drop multiplexer.

With this configuration, for example, the wavelength of an optical signal transmitted from a transponder can be changed to a different wavelength under remote control by the monitoring control device without change of physical wiring between the optical add/drop multiplexer and the transponder device.

Effects of the Invention

According to the present invention, it is possible to provide an optical add/drop multiplexer having reduced

BRIEF DESCRIPTION OF DRAWINGS

FIG. 5 is a diagram illustrating a table configuration of a wavelength use management table stored in a DB in the monitoring control device in the light transmission system of the present embodiment.

DESCRIPTION OF EMBODIMENTS

An embodiment of the present invention will be described below with reference to the accompanying drawings. In all drawings of the present specification, components having functions corresponding to each other are denoted by an identical reference sign, and description thereof is omitted as appropriate.

Configuration of Embodiment

Figure 1:
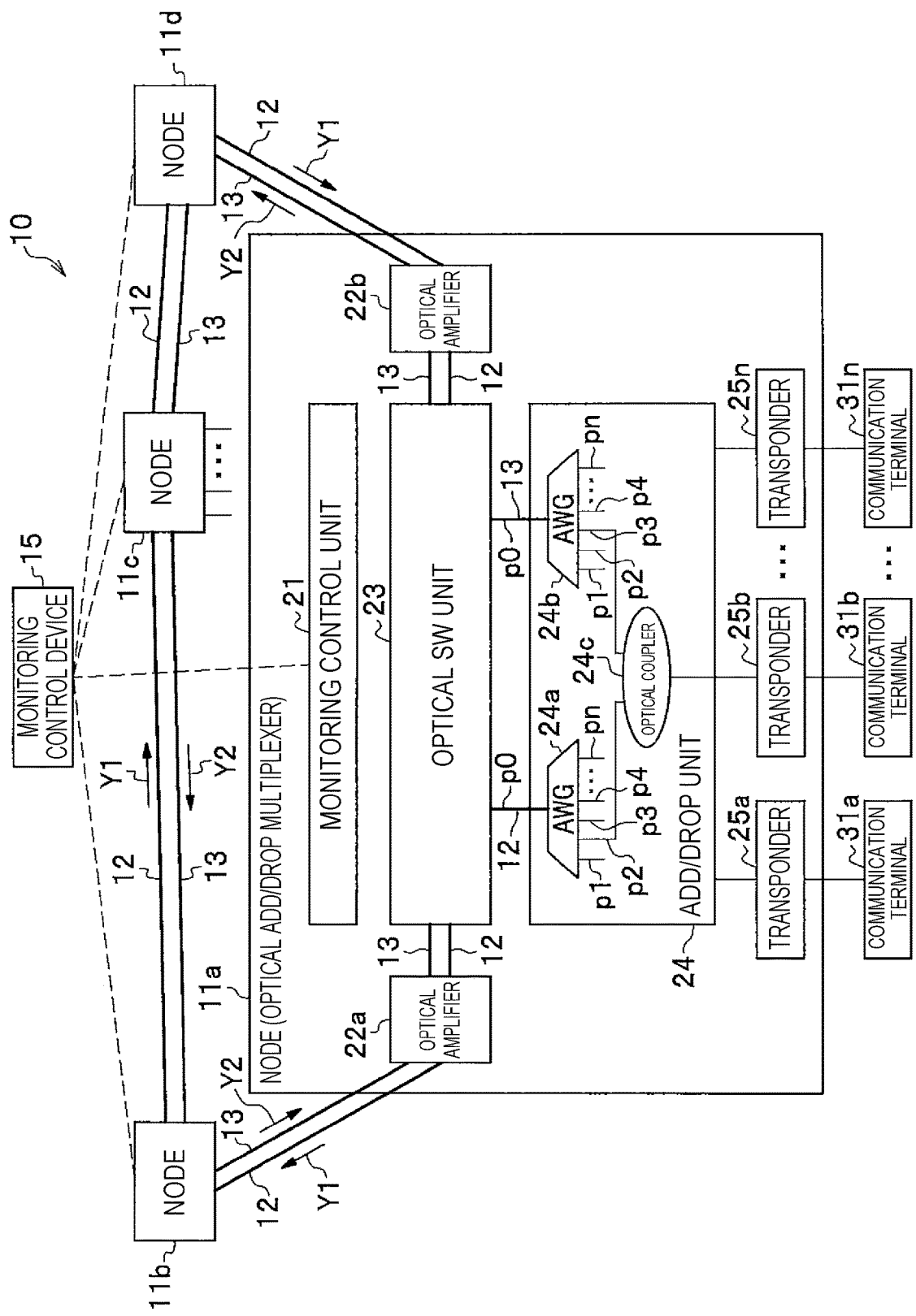
FIG. 1 is a block diagram illustrating the configuration of a light transmission system using an optical add/drop multiplexer according to an embodiment of the present invention.

FIG. 1 is a block diagram illustrating the configuration of a light transmission system using an optical add/drop multiplexer according to the embodiment of the present invention.

This light transmission system 10 illustrated in FIG. 1 has a configuration in which nodes 11a, 11b, 11c, and 11d as the optical add/drop multiplexers are connected with one another in a ring shape through optical fibers 12 and 13 as two light transmission paths. Data can be transmitted through the optical fibers 12 and 13 in opposite directions or an identical direction, for example, in the clockwise direction and/or the counterclockwise direction. In the present example, it is assumed that data is transmitted in opposite directions of the clockwise direction indicated by an arrow Y1 along the optical fiber 12 and the anticlockwise direction indicated by an arrow Y2 along the optical fiber 13.

The nodes 11a to 11d each have an identical configuration including a monitoring control unit 21, optical amplifiers 22a and 22b, an optical switch (SW) unit 23, an add/drop unit 24, and a plurality of transponders 25a, 25b, . . . , and 25n as illustrated representatively with the node 11a. The monitoring control unit 21 is connected with an external monitoring control device 15 configured to monitor and control the corresponding one of the nodes 11a to 11d. The transponders 25a, 25b, . . . , and 25n are connected with external communication terminals 31a, 31b, . . . , and 31n such as personal computers.

However, FIG. 1 illustrates a configuration in which each transponder (for example, the transponder 25a) is connected with one communication terminal 31a, but the one transponder 25a may be connected with a plurality of communication terminals 31a.

The add/drop unit 24 includes a plurality (two) of AWGs (arrayed waveguide gratings) 24a and 24b and an optical coupler 24c. The AWGs 24a and 24b each have an input-output port configuration of one input-output×N input-outputs (expressed as 1×N), including one port p0 on the one input-output side (one side) and N ports p1, p2, p3, p4, . . . , pn on the N input-output side (the other side). The optical coupler 24c includes ports of one input-output×two input-outputs (expressed as 1×2).

In the example illustrated in FIG. 1, the port p0 of the AWG 24a on the one side is connected with the optical fiber 12 through the optical SW unit 23, and the port p2 thereof on the other side is connected with the optical coupler 24c. The port p0 of the AWG 24b on the one side is connected with the optical fiber 13 through the optical SW unit 23, and the port p3 on the other side is connected with the optical coupler 24c. FIG. 1 illustrates a configuration in which the optical coupler 24c is connected with the transponder 25b.

An optical signal input-output channel interval (channel spacing) at each of the N ports p1 to pn of the AWG 24a (or the AWG 24b) is m times (a plurality of times or multiples) larger than an optical signal input-output channel interval at each port of the transponders 25a to 25n. Optical signals input to and output from the transponders 25a to 25n are also referred to as transponder signals.

Figure 2:
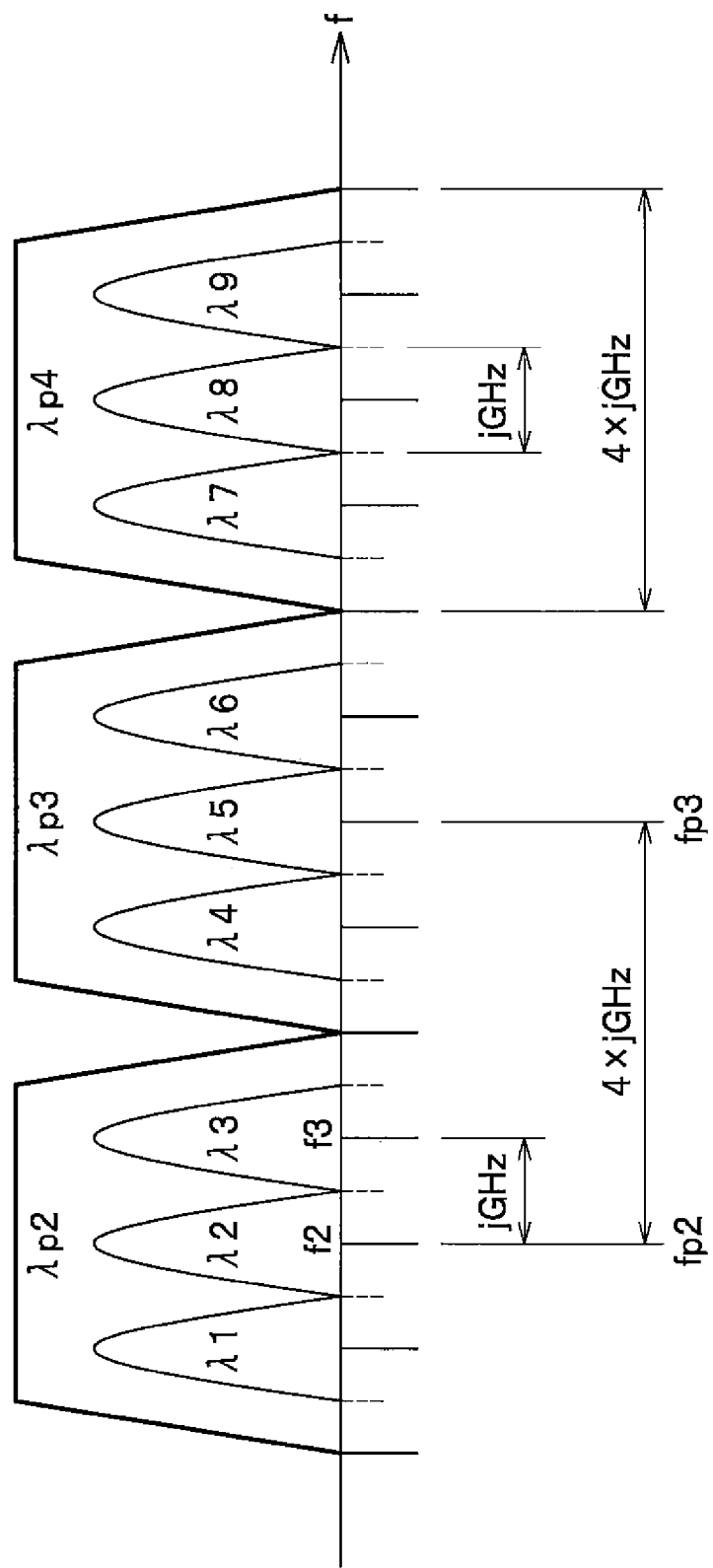
FIG. 2 is a diagram illustrating the waveform of a wavelength corresponding to the channel interval of ports of the AWG and the waveform of a wavelength corresponding to the channel interval of ports at a transponder.

FIG. 2 illustrates the waveform of a wavelength (also referred to as an AWG wavelength) λp2 corresponding to the channel interval at the port p2 of each of the AWGs 24a and 24b, the waveform of a wavelength λp3 corresponding to the channel interval at the port p3, and the waveform of a wavelength λp4 corresponding to the channel interval at the port p4. FIG. 2 also illustrates the waveforms of wavelengths (also referred to as transponder wavelengths) λ1 to λ9 corresponding to the channel intervals at respective ports of the transponders 25a to 25n.

The bandwidth (in other words, filter passband) of each of the AWG wavelengths λp2 to λp4 is, for example, 4×jGHz, which is four times larger than a bandwidth jGHz of the transponder wavelength λ8 as representatively illustrated with the waveform of the AWG wavelength λp4.

For example, the bandwidth of the AWG wavelength λp2 includes transponder signal bandwidths of the three different wavelengths λ1 to λ3, the bandwidth of the AWG wavelength λp3 includes transponder signal bandwidths of the three different wavelengths λ4 to λ6, and the bandwidth of the AWG wavelength λp4 includes transponder signal bandwidths of the three different wavelengths λ7 to λ9.

The channel interval of the AWG wavelengths λp2 to λp4 is 4×jGHz, which is representatively illustrated between a central frequency fp2 of the wavelength λp2 and a central frequency fp3 of the wavelength λP3. The channel interval 4×jGHz is four times larger than a channel interval jGHz between a central frequency f2 of the transponder wavelength λ2 and a central frequency f3 of the transponder wavelength λ3.

Accordingly, the wavelength λp2 through which transponder signals of the three wavelengths λ1 to λ3 can pass is input to and output from a port (for example, the port p2) of the AWG 24a. The wavelengths λ1 to λ3 that can pass through the bandwidth of the wavelength λp2 can be changed at, for example, the transponders 25a to 25n and wavelength selective switches (WSS) 23a and 23b to be described later under wavelength change control by the monitoring control unit 21. In addition, passing/cutoff wavelengths of each WSS can be changed by the wavelength change control.

Accordingly, for example, when an optical signal output from the transponder 25a to the port p2 through the optical coupler 24c is changed from the wavelength λ1 to the wavelength λ2 under wavelength change control by the monitoring control unit 21, the optical signal still can be output to the optical fiber 12 as the same path.

In a conventional node configuration including a conventional AWG, the channel spacing is not equal to multiples, and a port connected with a transponder and a wavelength (for example, the wavelength λ1) are fixed in a pair. Thus, change of the wavelength λ1 to the different wavelength λ2 or the like is restricted. When the wavelength λ1 is changed to, for example, the wavelength λ2, the transponder needs to be physically connected with another port of the AWG. Accordingly, multiplexed and demultiplexed wavelengths are fixed for each port, and thus it is impossible to pass through the AWG when the wavelength of the transponder is changed.

However, in the present invention, the wavelength λ1 can be changed to the wavelength λ2 under wavelength change control by the monitoring control unit 21 while the transponder 25b is connected with the port p2 of the AWG 24a, and can be output to the same path as described above. The wavelength change control is instructed by the monitoring control device 15.

Figure 3:
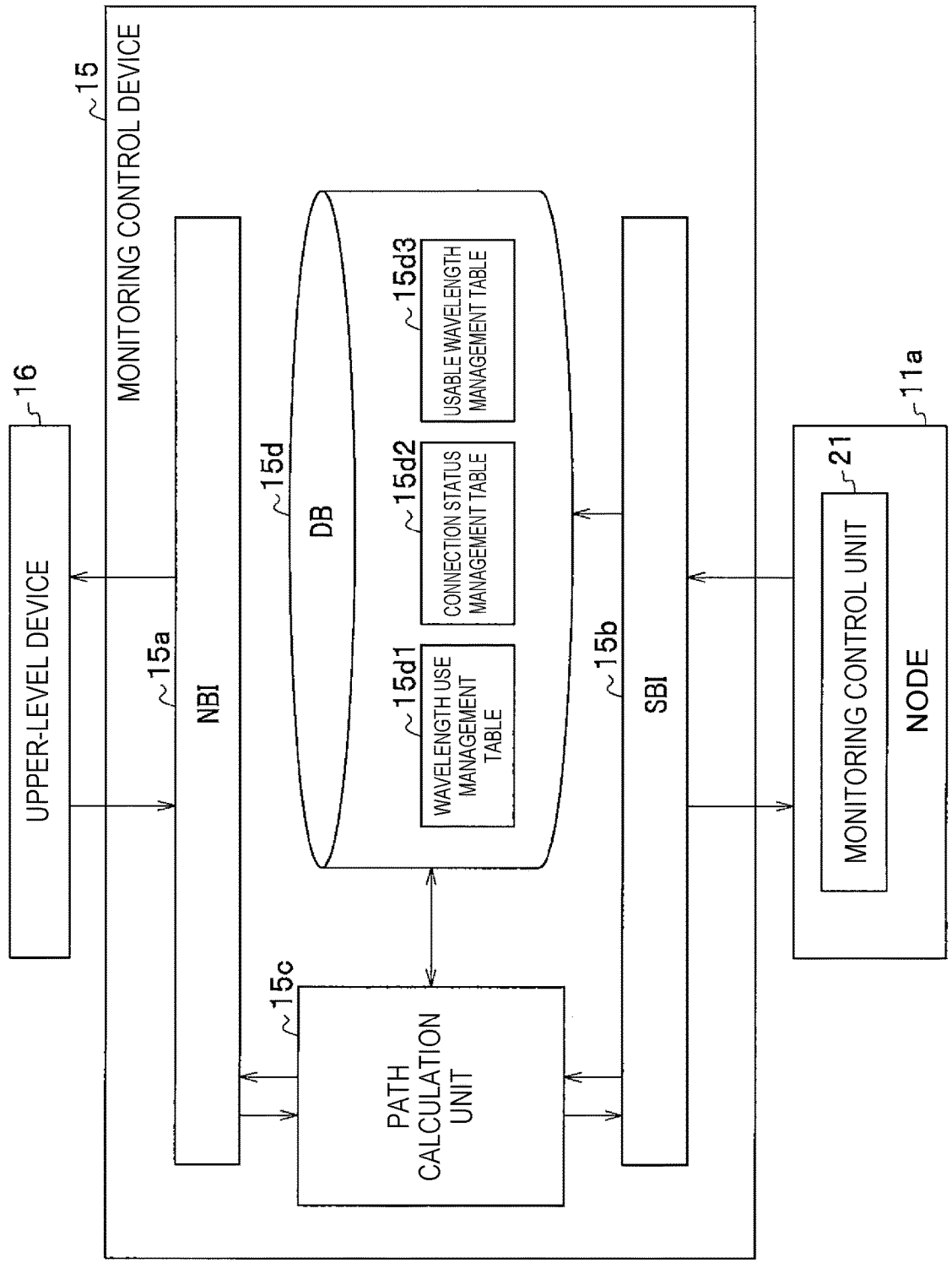
FIG. 3 is a block diagram illustrating the configuration of a monitoring control device in a light transmission system of the present embodiment.

Subsequently, the monitoring control device 15 will be described below with reference to FIG. 3. FIG. 3 illustrates the node 11a as a representative of the nodes 11a to 11d.

The monitoring control device 15 is configured as an element management system (EMS) or the like configured to manage instruments (elements) such as the nodes 11a to 11d (FIG. 1) included in a network. In a case of the EMS, a higher-level device 16 connected at a higher level of the monitoring control device 15 is a network management system (NMS) configured to manage the network. The NMS performs processing of collecting and managing information related to equipment included in the network and settings thereof, monitoring and recording the status of data flowing in the network, the operation situation of each instrument, and the like, and giving notification to an administrator when anomaly or a presage thereof is sensed.

The monitoring control device 15 is disposed separately from the node 11a in a remote manner or the like and instructs optical path generation control, wavelength change control, and the like to the monitoring control unit 21 of the node 11a. The monitoring control device 15 includes a north-bound interface (NBI) 15a, a south-bound interface (SBI) 15b, a path calculation unit 15c, and a database (DB) 15d. The NBI 15a is an interface for the higher-level device 16. The SBI 15b is an interface for a lower-level device (in this example, the node 11a).

The DB 15d stores a wavelength use management table 15d1, a connection status management table 15d2, and a usable wavelength management table 15d3. These tables are also referred to as management tables 15d1, 15d2, and 15d3.

Figure 4:
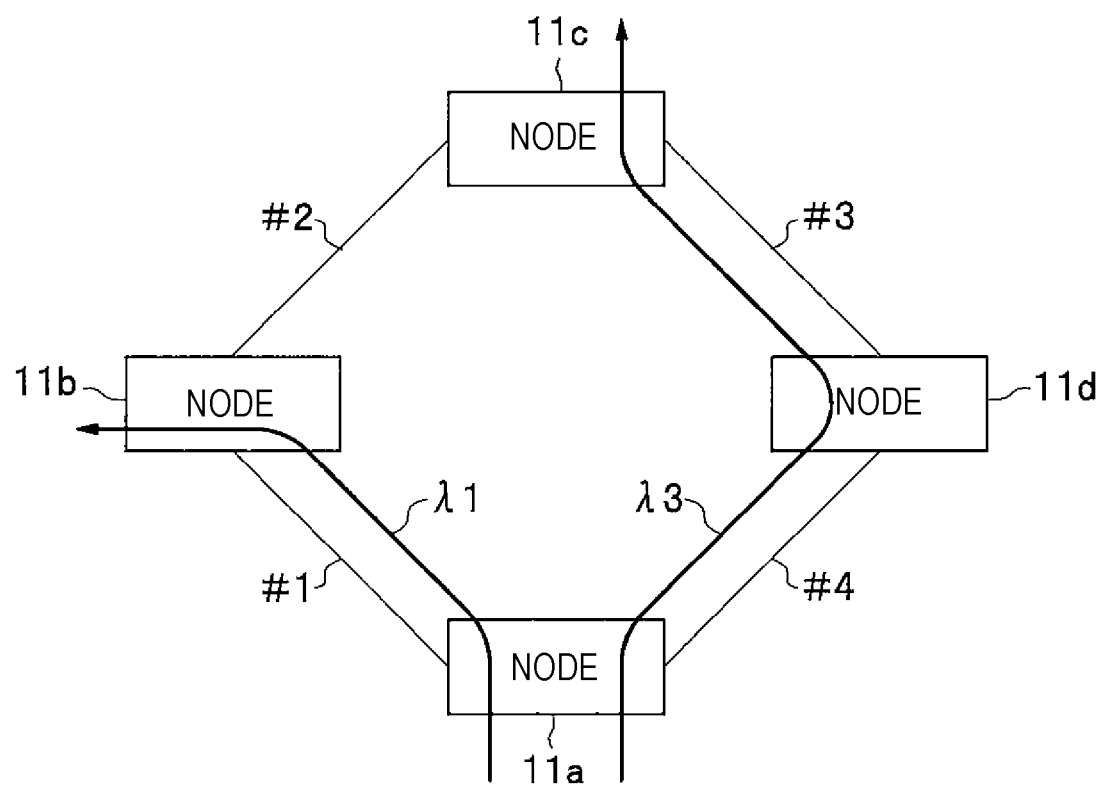
FIG. 4 is a block diagram illustrating the number of each link between connected nodes and the use state of each wavelength in the light transmission system of the present embodiment.

The wavelength use management table 15d1 manages a wavelength use status of each link by the optical fibers 12 and 13 as follows. For example, it is assumed that the nodes 11a to 11d have link numbers #1, #2, #3, and #4 as illustrated in FIG. 4. In this case, an optical signal of the wavelength λ1 is transmitted from the node 11a via the link #1 and passes through the node 1ib. In addition, it is assumed that an optical signal of the wavelength λ3 is transmitted from the node 11a via the link #4 and the node 11d and then via the link 3 and passes through the node 11c.

FIG. 5 illustrates the management table 15d1 that manages the wavelength use status of each of the links #1 to #4 in this case. The management table 15d1 has a matrix configuration having the link numbers #1, #2, #3, and #4 in columns and having the wavelength λ1, λ2, λ3, λ4, . . . in rows. In a case of the wavelength use status of each link, which is illustrated in FIG. 4, the management table 15d1 indicates that the wavelength λ1 is "in use" at the link number #1 and "available" at the other link numbers #2 to #4. It is indicated that the wavelength λ2 is "available" at all link numbers #1 to #4. It is indicated that the wavelength λ3 is "available" at the link numbers #1 and #2 and "in use" at the link numbers #3 and #4. It is indicated that the wavelength λ4 is "available" at all link numbers #1 to #4. In this manner, the management table 15d1 manages the wavelength use status of each of the links #1 to #4.

Back in FIG. 3, the connection status management table 15d2 manages the connection statuses of the add/drop unit 24 and the transponders 25a to 25n of each of the nodes 11a to 11d (FIG. 1). The usable wavelength management table 15d3 manages usable wavelengths for respective paths of the transponders 25a to 25n in each of the nodes 11a to 11d.

The path calculation unit 15c performs calculation to be described later when optical path generation control, wavelength change control, or the like is requested by the higher-level device 16 through the NBI 15a. The request is also performed by a person such as the administrator.

Specifically, the path calculation unit 15c reads, from the management tables 15d1 to 15d3 stored in the DB 15d, the number of available wavelengths of each link for the optical fibers 12 and 13, the path of each of the transponders 25a to 25n (FIG. 1), and the number of usable wavelengths, and performs calculation that allocates an optical path using available optical paths (the optical fibers 12 and 13) and available wavelengths based on the read information.

In addition, the path calculation unit 15c sends, to the monitoring control unit 21 of each of the nodes 11a to 11d through the SBI 15b in accordance with a result of the calculation, an instruction for setting a path through the nodes 11a to 11d and use wavelengths, such as an instruction of transmission wavelengths to the transponders 25a to 25n.

Through control in accordance with the setting instruction, the monitoring control unit 21 sets paths and usable wavelengths of the transponders 25a to 25n and then sends setting change complete notification to the monitoring control device 15. The contents of the notification are stored in the management tables 15d1 to 15d3.

The monitoring control device 15 thus configured can achieve a CDC function at low cost, but has constraints on wavelengths selectable for each transponder output path, depending on characteristics and connection ports of the AWGs 24a and 24b connected with each of the transponders 25a to 25n.

Specifically, the number of optical paths that can be accommodated decreases when simple accommodation designing that, for example, optical paths are sequentially set with priorities in ascending order of the wavelength number is performed without sufficient consideration on the connection status and optical path accommodation status of the transponders 25a to 25n at each of the nodes 11a to 11d. In addition, there is another defect designing man-hour significantly increases when optical path accommodation designing is manually performed with consideration on various factors.

Thus, to avoid these defects, the monitoring control device 15 of the present embodiment can manage available wavelength resources and usable wavelengths at the nodes 11a to 11d and recommend or automatically set use wavelengths in response to a request for optical path generation and change.

Figure 6:
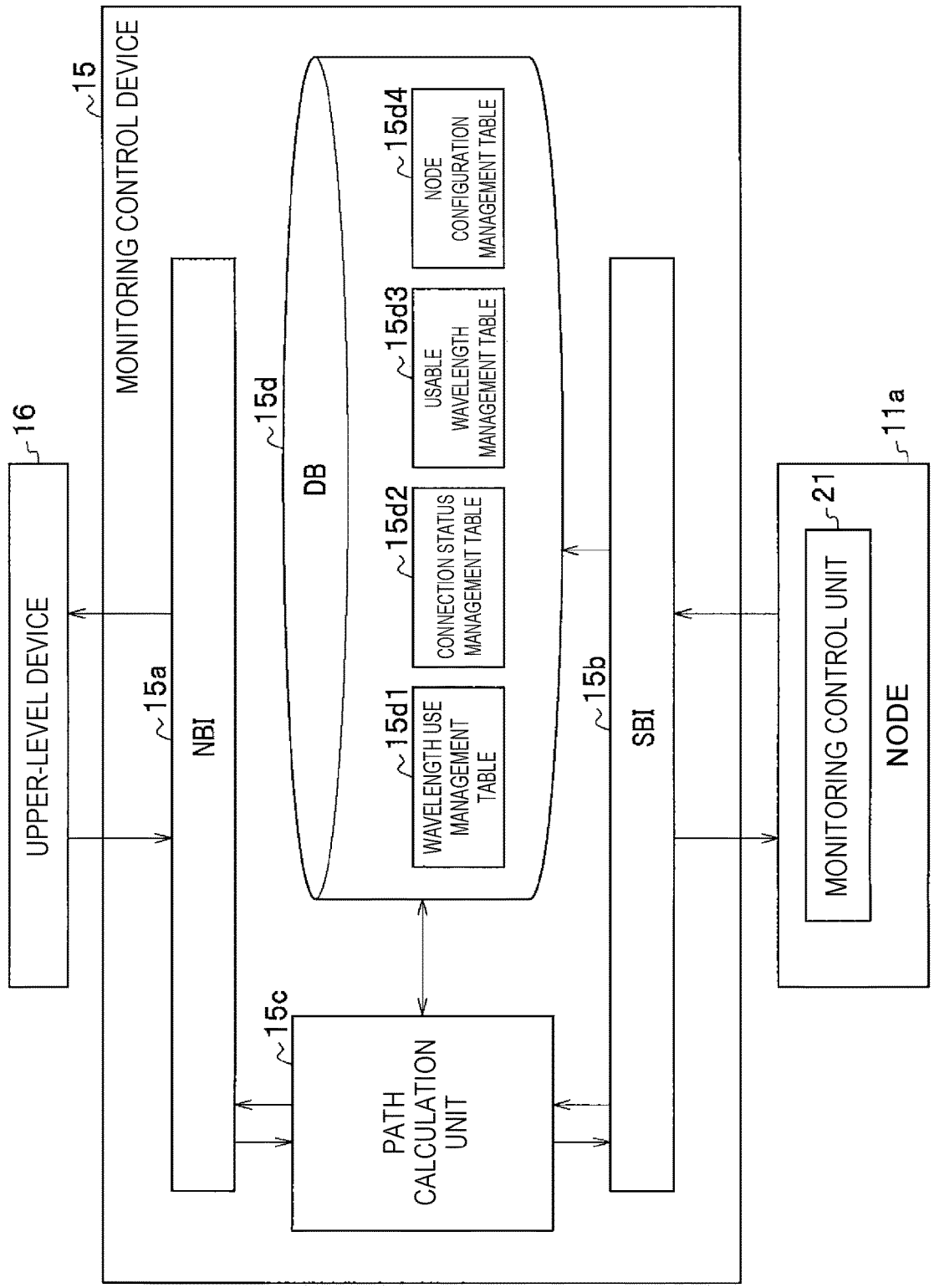
FIG. 6 is a block diagram illustrating configuration of the monitoring control device in the light transmission system of the present embodiment.

In addition, as illustrated in FIG. 6, the monitoring control device 15 may further include a node configuration management table 15d4 in the DB 15d. The node configuration management table 15d4 manages a node type that indicates whether the nodes 11a to 11d are each a node without the CDC function, a node of the existing CDC function, or a node including the add/drop unit 24 of the present invention.

When optical path accommodation designing with the node type taken into consideration is performed in the light transmission system 10 in accordance with the management, a network including an existing ROADM and an existing CDC-ROADM in mixture at each of the nodes 11a to 11d (FIG. 1) can be achieved. Thus, a network can be flexibly established in accordance with physical topology and traffic situation.

<Exemplary Specific Configurations of Light SW Unit and Add/Drop Unit>

Figure 7:
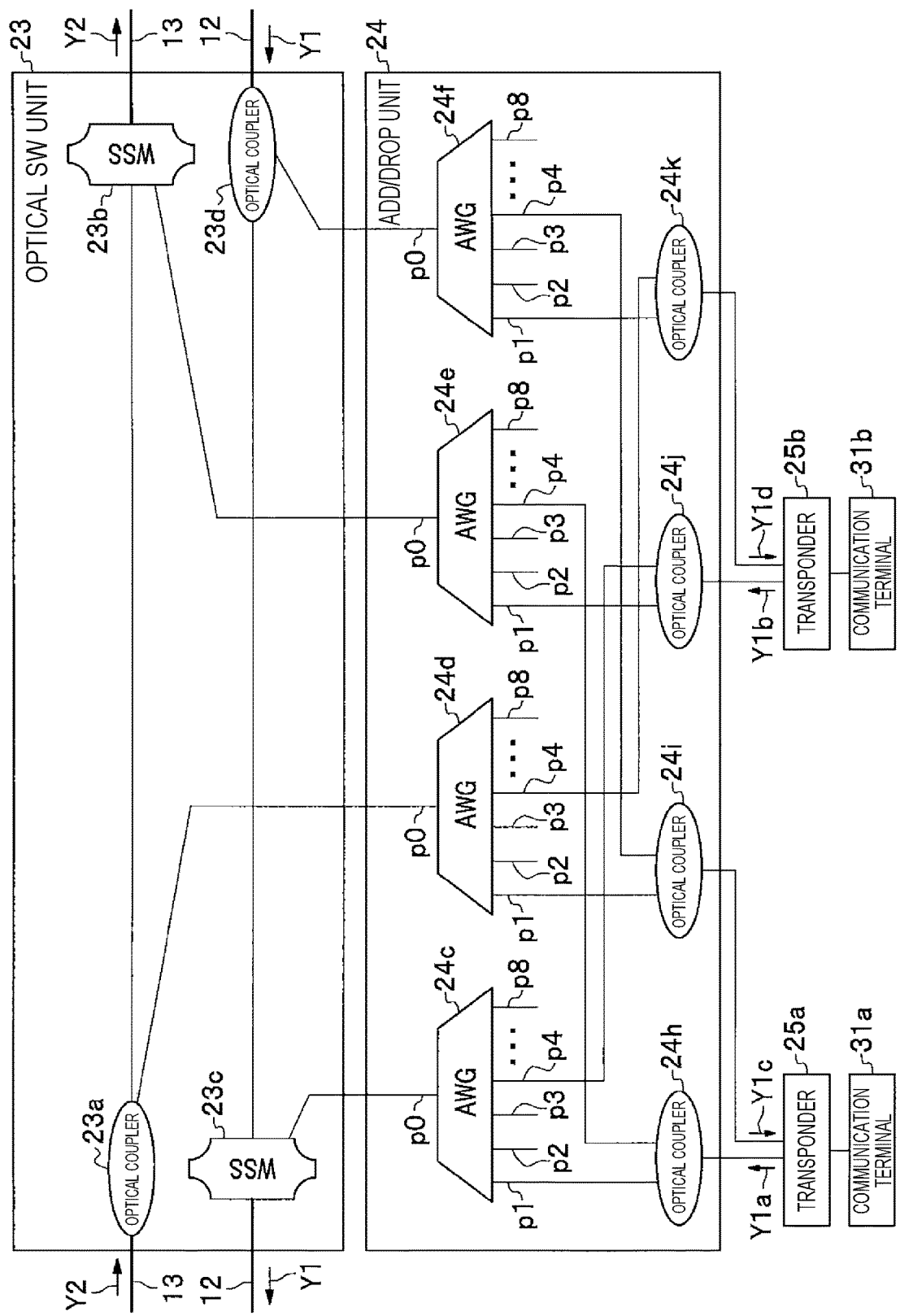
FIG. 7 is a block diagram illustrating specific configurations of a light SW unit and an add/drop unit in the light transmission system of the present embodiment.

FIG. 7 is a block diagram illustrating specific configurations of the light SW unit 23 and the add/drop unit 24 in the light transmission system 10 of the present embodiment.

The light SW unit 23 includes an optical coupler 23a interposed and connected with the one optical fiber 13, and a wavelength selective switch (WSS) 23b, and includes an optical coupler 23d interposed and connected with the other optical fiber 12, and a WSS 23c.

The WSSs 23b and 23c are each an optical switch that has a wavelength multiplexing-demultiplexing function to connect a wavelength-division-multiplexed WDM signal transmitted to the optical fibers 12 and 13 with a port different for each wavelength and is capable of changing a combination of a wavelength and a port under remote control by the monitoring control device 15. The WSSs 23b and 23c each also have an attenuation function to adjust a passing light power level for each wavelength.

When such WSSs 23b and 23c are used, wire switching at an on-site node is unnecessary at change of a transmission-reception wavelength, for example, from λ1 to λ2, and fast path change can be performed through a remote operation. This processing function achieves the above-described color-less function as the first function because a signal path inside a node has no constraints due to the wavelength (color) of an optical signal.

The add/drop unit 24 includes 1×8 AWGs 24c, 24d, 24e, and 24f, and 1×2 optical couplers 24h, 24i, 24j, and 24k connected with ports p1 and p4 of the AWGs 24c to 24f.

The AWGs 24c and 24e and the optical couplers 24h and 24j connected with the ports p1 and p4 thereof are combined to achieve an add function (add unit). The AWGs 24d and 24f and the optical couplers 24i and 24k connected with the ports p1 and p4 thereof are combined to achieve a drop function (drop unit). Hereinafter, these AWGs are also referred to as the AWGs 24c and 24e of the add function and the AWGs 24d and 24f of the drop function.

The AWGs 24c to 24f each include the one port p0 on the one side and the eight ports p1 to p8 on the other side. Transponder signals of the eight wavelengths λ1 to λ8 of different bands can pass through the bandwidth of the AWG wavelength (transmission wavelength) λp for each of the ports p1 to p8 (refer to the three wavelengths λ1 to λ3 in FIG. 2).

It is assumed that the bandwidth of one AWG wavelength λp is 400 GHz and the channel interval of transmission bands of the eight ports p1 to p8 is 400 GHz. It is assumed that the bandwidth of each transponder signal is 50 GHz and the channel interval of transponder signals is 50 GHz.

In the AWG 24c of the add function, the port p0 on the one side is connected with a port of the WSS 23c on the optical fiber 12 side, the port p1 on the other side is connected with the transponder 25a through the optical coupler 24h, and the port p4 is connected with the transponder 25b through the optical coupler 24j. In the AWG 24e of the add function, the port p0 on the one side is connected with a port of the WSS 23b on the optical fiber 13 side, the port p1 on the other side is connected with the transponder 25b through the optical coupler 24j, and the port p4 is connected with the transponder 25a through the optical coupler 24h.

In the AWG 24d of the drop function, the port p0 on the one side is connected with the optical coupler 23a on the optical fiber 13 side, the port p1 on the other side is connected with the transponder 25a through the optical coupler 24i, and the port p4 is connected with the transponder 25b through the optical coupler 24k. In the AWG 24f of the drop function, the port p0 on the one side is connected with the optical coupler 23d on the optical fiber 12 side, the port p1 on the other side is connected with the transponder 25b through the optical coupler 24k, and the port p4 is connected with the transponder 25a through the optical coupler 24i.

In such a configuration, under remote control of the WSSs 23b and 23c, an optical signal of an optional wavelength can be transmitted or cutoff between the transponders 25a and 25b and the optical fibers 12 and 13 through the add/drop unit 24 as follows.

Specifically, it is assumed that, for example, an optical signal of the wavelength λ1 is output from the transponder 25a in a direction indicated with an arrow Y1a. The optical signal of the wavelength λ1 is input to the port p1 of the AWG 24c of the add function through the optical coupler 24h and output from the port p0 to the WSS 23c on the optical fiber 12 side. When the WSS 23c is controlled to transmit the wavelength λ1, the WSS 23c transmits the optical signal of the wavelength λ1 to the fiber 12 in the direction indicated with the arrow Y1. When the WSS 23c is controlled to cut off the wavelength λ1, the WSS 23c cuts off the optical signal of the wavelength λ1.

This control of transmission and cutoff at the WSS 23c is similarly performed at the WSS 23b on the optical fiber 13 side. Specifically, for example, an optical signal of the wavelength λ2 from the transponder 25b, which is indicated with an arrow Y1b, is transmitted to the optical fiber 13 or cut off at the WSS 23b.

The optical coupler 23a on the optical fiber 13 side bifurcates, for example, an optical signal of the wavelength λ3 transmitted through the optical fiber 13. The bifurcated optical signal of the wavelength λ3 is input through the port p0 of the AWG 24d of the drop function and input from the port p1 to the transponder 25a through the optical coupler 24i as illustrated with an arrow Y1c. However, in a case in which the optical signal of the wavelength λ3 is output from the port p4 of the AWG 24d, the optical signal of the wavelength λ3 is input to the transponder 25b through the optical coupler 24k as illustrated with an arrow Y1d.

Similarly, the optical coupler 23d on the optical fiber 12 side bifurcates, for example, an optical signal of the wavelength λ4 transmitted through the optical fiber 12. The bifurcated optical signal of the wavelength λ4 is input to the port p0 of the AWG 24f of the drop function and input from the port p1 to the transponder 25b through the optical coupler 24k as illustrated with the arrow Y1d. However, in a case in which the optical signal of the wavelength λ4 is output from the port p4 of the AWG 24f of the drop function, the optical signal of the wavelength λ4 is input to the transponder 25a through the optical coupler 24i as illustrated with the arrow Y1c.

In such optical signal transmission, the monitoring control unit 21 performs wavelength change control on the nodes 11a to 11d in accordance with a wavelength change control instruction from the monitoring control device 15 as follows. For example, it is assumed that an optical signal of the wavelength λ1 is transmitted from the transponder 25a to the port p1 of the AWG 24c of the add function through the optical coupler 24h as illustrated with the arrow Y1a. In this case, when the wavelength λ1 of the optical signal is changed to the wavelength λ2 at the transponder 25a and the WSS 23c being configured to transmit the wavelength λ1 is remotely controlled to transmit the wavelength λ2, the optical signal of the wavelength λ2 after the wavelength change can be transmitted to a path (the arrow Y1) identical to that for the optical signal of the wavelength λ1 before the change.

In the AWG 24c of the add function, as described above, transponder signals of the eight wavelengths λ1 to λ8 can pass through the bandwidth of the transmission wavelength λp of the one port p1. Thus, when the wavelength λ1 of the optical signal from the transponder 25a is changed to the wavelength λ2 as described above, the optical signal of the wavelength λ2 after the change is transmitted from the WSS 23c to the same optical fiber 12 through the port p1 of the AWG 24c like the optical signal of the wavelength λ1 before the change.

Accordingly, with the above-described color-less function as the first function, an optical signal from a transponder can be output to the same path at an optional wavelength without change of physical wiring.

When the wavelength λ1 of the optical signal from the transponder 25a is changed to a wavelength Xx other than the wavelengths λ1 to λ8 and the WSS 23b is changed to the wavelength Xx to transmit by wavelength change control, the optical signal of the wavelength Xx after the change is transmitted from the WSS 23b to the optical fiber 13 through the port p4 of the AWG 24e of the add function in the direction of the arrow Y2.

Accordingly, with the above-described direction-less function as the second function, an optical signal from a transponder can be output through an optional path, in other words, a different path without change of physical wiring.

An optical signal of the wavelength λ1 is output from the one transponder 25a to the port p1 of the AWG 24c of the add function as illustrated with the arrow Y1a, and an optical signal of the same wavelength λ1 is output from the other transponder 25b to the port p1 of the AWG 24e of the add function as illustrated with the arrow Y1b. In this case, the optical signals of the same wavelength λ1 are transmitted to the optical fibers 12 and 13 as different transmission paths through the different AWGs 24c and 24e, and thus do not collide.

Accordingly, with the above-described contention-less function as the third function, output to a path different from an existing path can be performed at the same wavelength from different transponders without change of physical wiring.

Effects of Embodiment

The following describes effects of the optical add/drop multiplexer as each of the nodes 11a to 11d according to the present embodiment. The optical add/drop multiplexer drops or adds an optical signal between the optical add/drop multiplexer and each of the transponders 25a to 25n connected with the communication terminals 31a to 31n, the being transmitted by wavelength division multiplexing to a light transmission path included in a communication network.

(1) The optical add/drop multiplexer is connected between light transmission paths as the optical fibers 12 and 13 and the transponders 25a to 25n and outputs, to the transponders 25a to 25n through ports, optical signals transmitted through the light transmission paths. The optical add/drop multiplexer includes the AWGs 24a and 24b and the optical coupler 24c. The AWGs 24a and 24b transmit, to the light transmission paths through ports, optical signals transmitted from the transponders 25a to 25n. The optical coupler 24c connects a plurality of ports of the AWGs 24a and 24b to the transponders 25a to 25n through coupling or bifurcation.

The channel interval of ports of the AWGs 24a and 24b is equal to a multiple of the channel interval of ports of the transponders 25a to 25n. In addition, transponder signals as optical signals of a plurality of different wavelengths to and from one or a plurality of the transponders 25a to 25n can pass through ports of the AWGs 24a and 24b.

With this configuration, a plurality of optical signals having wavelengths corresponding to the channel interval of one or a plurality of transponders 25a to 25n of different wavelengths can pass through the channels of the AWGs 24a and 24b at different wavelengths. Thus, when the wavelength (for example, the wavelength λ1) of an optical signal from each of the transponders 25a to 25n is changed to another wavelength λ2, similarly to the optical signal of the wavelength λ1 before the change, the optical signal of the wavelength λ2 after the change can be transmitted to the same light transmission path through ports of the AWGs 24a and 24b. Accordingly, optical signals from the transponders 25a to 25n can be output to the same path at different wavelengths without change of physical wiring between the optical add/drop multiplexer and each of the transponder devices 25a to 25n. Thus, the optical add/drop multiplexer of the present invention does not use, as the add/drop unit 24, an active device such as a multi cast switch or an amplifier configured to compensate light loss, which leads to reduction of device cost and electric power consumption.

(2) The optical SW unit 23 configured to transmit or cut off, when the light transmission path includes a different light transmission path, an optical signal between the different light transmission path and each of the AWGs 24a and 24b is provided. When the wavelength of a transponder signal is changed to a different wavelength at any of the transponders 25a to 25n, the optical SW unit 23 transmits the transponder signal of the changed wavelength to the different light transmission path.

With this configuration, an optical signal from each of the transponders 25a to 25n can be output through an optional path, in other words, a different path without change of physical wiring between the optical add/drop multiplexer and each of the transponders 25a to 25n.

(3) When the plurality of AWGs 24a and 24b and the plurality of transponders 25a to 25n are provided, the optical SW unit 23 transmits, to different light transmission paths, optical signals including transponder signals having an identical wavelength, transmitted from the different transponders 25a to 25n, and having passed through the different AWGs 24a and 24b.

With this configuration, output to a path different from an existing path can be performed at the same wavelength from the different transponders 25a to 25n without change of physical wiring between the optical add/drop multiplexer and each of the transponders 25a to 25n.

<First AWG Port Number Increasing Configuration>

Figure 8:
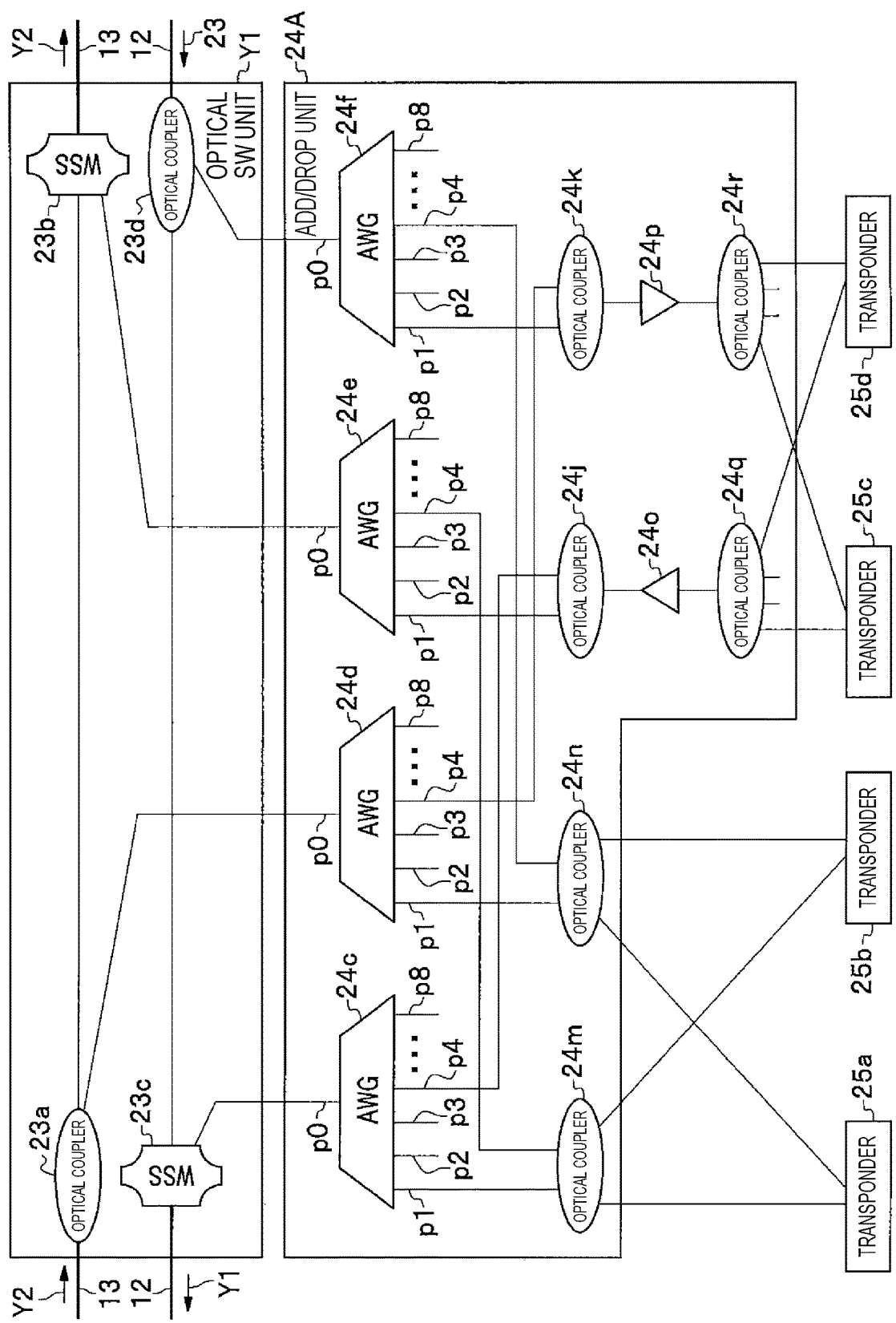
FIG. 8 is a block diagram illustrating a first port number increasing configuration of an add unit or drop unit including an AWG, an optical coupler, and the like in the add/drop unit in the light transmission system of the present embodiment.

FIG. 8 is a block diagram illustrating a first port number increasing configuration of the add and drop units including AWGs, optical couplers, and the like in the add/drop unit in the light transmission system.

The configuration of an add/drop unit 24A illustrated in FIG. 8 is different from the configuration of the add/drop unit 24 illustrated in FIG. 7 in that 2×2 (two input-outputs× two input-outputs) optical couplers 24m and 24n are provided in place of the 1×2 optical couplers 24h and 24i (FIG. 7), and 1×N optical couplers 24q and 24r are connected with the optical couplers 24j and 24k through optical amplifiers 24o and 24p. The optical couplers 24m and 24n are N×N optical couplers described in the claims.

The number of the 1×2 optical couplers 24h to 24k illustrated in FIG. 7 depends on the number of ports of the AWGs 24c to 24f. Thus, the number of transponders connectable with the add/drop unit 24 through the optical couplers 24h to 24k has a limitation.

Thus, in the present embodiment, the add/drop unit 24 is changed as follows. Specifically, the 2×2 optical coupler 24m is connected with the port p1 of the one AWG 24c of the add function and the port p4 of the other AWG 24e. In addition, the 2×2 optical coupler 24n is connected with the port p1 of the one AWG 24d of the drop function and the port p4 of the other AWG 24f (increasing design 1).

The 1×N optical coupler 24q is connected, through the optical amplifier 24o, with the 1×2 optical coupler 24j connected with the port p4 of the one AWG 24c of the add function and the port p1 of the other AWG 24e. In addition, the 1×N optical coupler 24r is connected, through the optical amplifier 24p, with the 1×2 optical coupler 24k connected with the port p4 of the one AWG 24d of the drop function and the port p1 of the other AWG 24f (increasing design 2). Only the increasing design 1 or the increasing design 2 may be implemented in the configuration of the add/drop unit 24A in FIG. 8.

In the configuration in FIG. 7, the optical couplers 24h and 24j are connected with the AWG 24c of the add function, and the optical couplers 24i and k are connected with the AWG 24d of the drop function, thereby forming a first system. In addition, in the configuration in FIG. 7, the optical couplers 24j and 24h are connected with the AWG 24e of the add function, and the optical couplers 24k and 24i are connected with the AWG 24f of the drop function, thereby forming a second system. Thus, eight transponders are connected for each system, and 16 transponders are connected for the two systems. However, in the increasing design 1 of the present embodiment, since the 2×2 optical couplers 24q and 24r are connected as illustrated in FIG. 8, 32 transponders, which is twice as the above-described 16 transponders, are connectable.

In the increasing design 2, the optical coupler 24q in addition to the AWGs 24c and 24e and the optical couplers 24m, 24j, and 24h connected with the ports p1 and p4 thereof are combined to achieve an add function. The optical coupler 24r in addition to the AWGs 24d and 24f and the optical couplers 24n and 24k connected with the ports p1 and p4 thereof are combined to achieve a drop function.

Since connected are the two 1×N optical couplers 24q and 24r with the AWGs 24c and 24e and the two 1×2 optical couplers 24j and 24k connected with the AWGs 24d and 24f, optical signals multiplexed at the 1×N optical couplers 24q and 24r pass through the AWGs 24c and 24e. In this case, only optical signals corresponding to the ports p1 to p8 of the AWGs 24c and 24e pass through the AWGs. Thus, in the increasing design 2, wavelengths in a number Wx equal to "AWG channel interval/channel interval of transponder output optical signals −1" can be input to the ports p1 to p8 in effective. The upper limit value of an effective number of connectable transponders is "the wavelength number Wx×the number of AWG ports". In this case, large signal loss occurs through N bifurcations at the optical couplers 24q and 24r, but the signal loss is solved through signal amplification by the amplifiers 24o and 24r each connected between the corresponding one of the two 1×2 optical couplers 24j and 24k and the corresponding one of the two newly connected 1×N optical coupler 24q and 24r.

With this first AWG port number increasing configuration, it is possible to increase the number of transponders connectable with the AWGs 24c and 24e of the add function and the AWGs 24d and 24f of the drop function through 2×2 and 1×N optical couplers.

<Second AWG Port Number Increasing Configuration>

Figure 9:
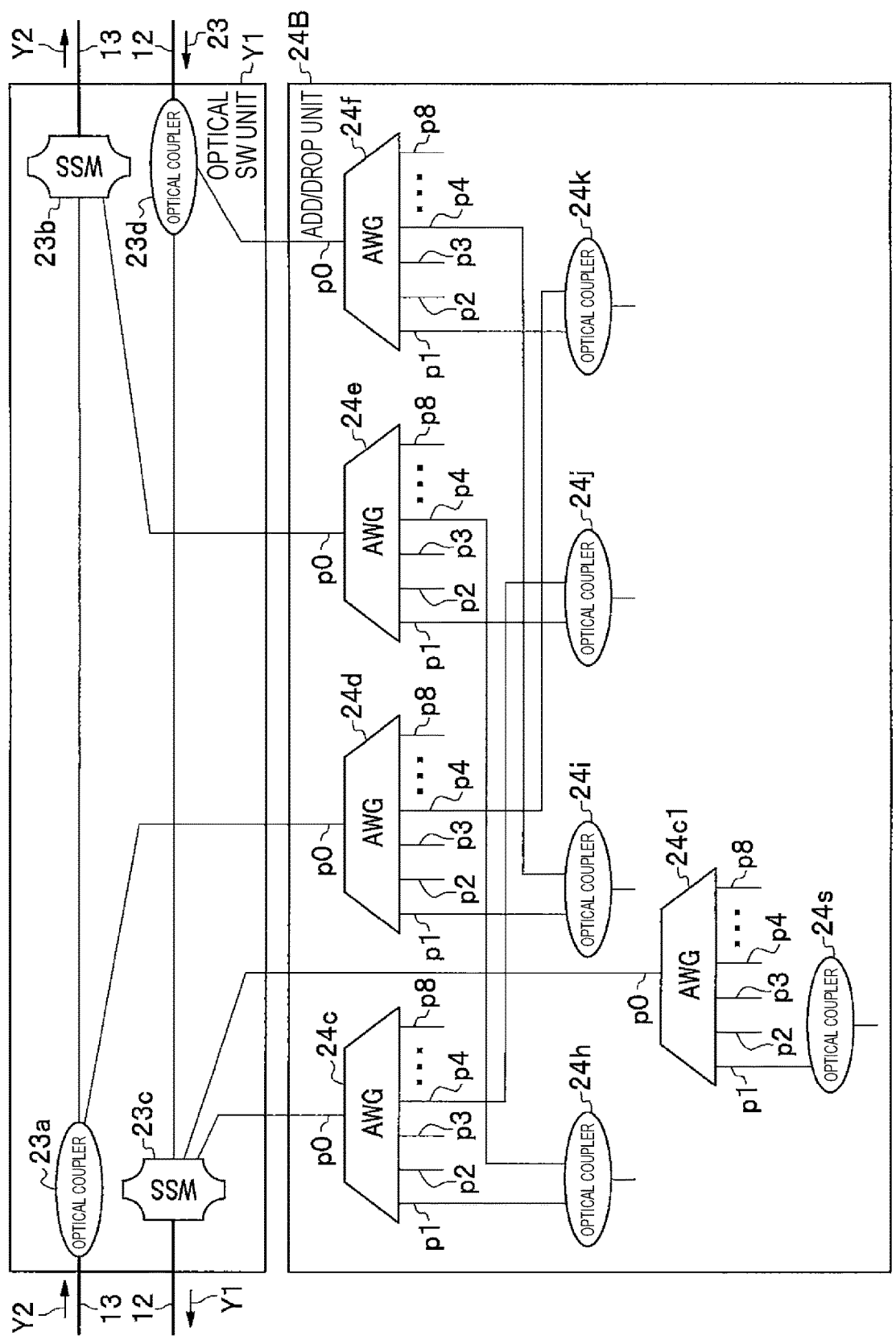
FIG. 9 is a block diagram illustrating a second port number increasing configuration of the add unit or the drop unit including an AWG, an optical coupler, and the like in the add/drop unit in the light transmission system of the present embodiment.

FIG. 9 is a block diagram illustrating a second port number increasing configuration of the add and drop units including AWGs and optical couplers in the add/drop unit in the light transmission system.

The configuration of an add/drop unit 24B illustrated in FIG. 9 is different from the add/drop unit 24 illustrated in FIG. 7 in that, in addition to the 1×N AWG 24c and the optical coupler 24h in existing connection, 1×N AWG 24c1 and an optical coupler 24s are connected in parallel with the WSS 23c. The AWG 24c1 and the optical coupler 24s operate as the add function as well. In the connection, it is assumed that a port transmission wavelength (target wavelength $\lambda j$) of the AWG 24c1 as a connection target has a plurality of relations as illustrated in FIG. 10 with a port transmission wavelength (reference wavelength $\lambda k$) of the AWG 24c in existing connection.

Figure 10:
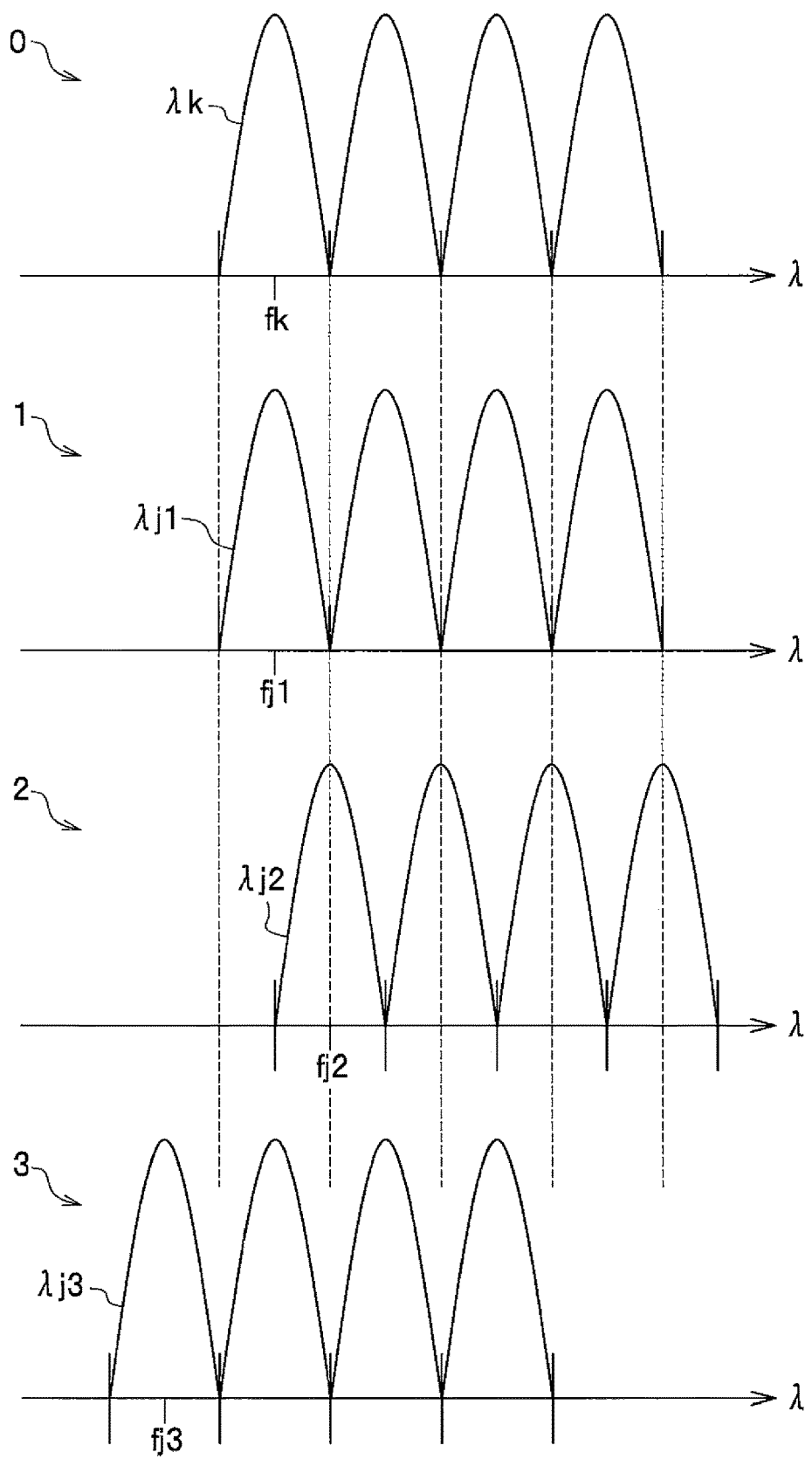
FIG. 10 is a diagram illustrating the relation between a port transmission wavelength (reference wavelength) for a 1×N AWG in existing connection and a port transmission wavelength (target wavelength) of a 1×N AWG in additional connection in parallel in the add/drop unit in the light transmission system of the present embodiment.

It is assumed that the first relation is a relation in which a central frequency $fj1$ of the target wavelength $\lambda j1$ indicated by Reference Sign 1 in FIG. 10 is adjusted to a central frequency $fk$ of the reference wavelength $\lambda k$ indicated by Reference Sign 0.

It is assumed that the second relation is a relation in which a central frequency fj2 of a target wavelength λj2 indicated by Reference Sign 2 is shifted by half wavelength relative to the central frequency fk of the reference wavelength λk.

It is assumed that the third relation is a relation in which a central frequency fj3 of a target wavelength λj3 indicated by Reference Sign 3 is shifted by one wavelength relative to the central frequency fk of the reference wavelength λk.

Alternatively, the target wavelength λj may have both characteristics of the second relation and the third relation.

In this manner, when the 1×N AWG 24c1 and the optical coupler 24s are newly connected in parallel with the WSS 23 in addition to the 1×N AWG 24c and the optical coupler 24h in existing connection, transponders in a number equal to the number of N ports of the newly connected AWG 24c1 can be additionally connected. Thus, with the second AWG port number increasing configuration, since an AWG and an optical coupler are newly connected in parallel with a WSS, it is possible to increase the number of transponders connectable with the AWGs 24c and 24e and the AWGs 24d and 24f as AWGs.

<Mixed Configuration of Single Carrier Optical Path and Multi Carrier Optical Path>

Figure 11:
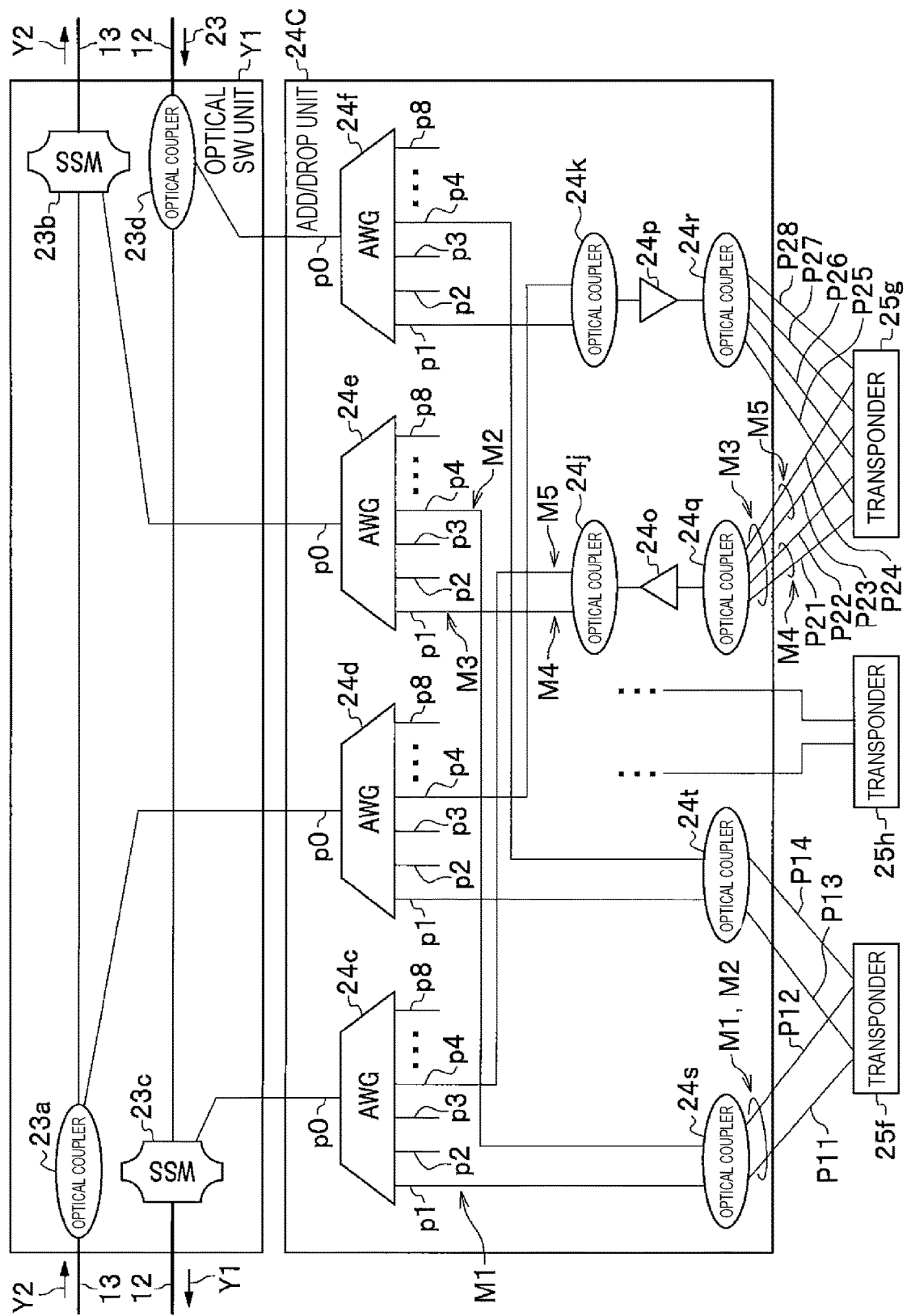
FIG. 11 is a block diagram illustrating a mixed configuration of a single carrier optical path and a multi carrier optical path in the light transmission system of the present embodiment.

FIG. 11 is a block diagram illustrating a mixed configuration of a single carrier optical path and a multi carrier optical path in the light transmission system.

In the mixed configuration illustrated in FIG. 11, components described below are provided in addition to the components of the add/drop unit 24 illustrated in FIG. 7. Specifically, as illustrated in FIG. 11, the optical couplers 24h and 24i (refer to FIG. 7) are removed, the 2×2 optical couplers 24s and 24t are connected with the port p1 of the AWG 24c and the port p4 of the AWG 24e (first additional configuration), and the 1×4 optical couplers 24q and 24r are additionally connected with the existing optical couplers 24j and 24k (refer to FIG. 7) through the optical amplifiers 24o and 24p (second additional configuration).

The AWGs 24c and 24e and the optical couplers 24s, 24j, and 24q connected with the ports p1 and p4 thereof are combined to achieve an add function. The AWGs 24d and 24f and the optical couplers 24t, 24k, and 24r connected with the ports p1 and p4 thereof are combined to achieve a drop function.

A multi carrier optical path transponder 25f including two transmission ports p11 and p12 and two reception ports p13 and p14 is connected with the additionally connected 1×2 optical couplers 24s and 24t. Furthermore, a multi carrier optical path transponder 25g including four transmission ports p21, p22, p23, and p24 and four reception ports p25, p26, p27, and p28 is connected with the additionally connected 1×4 optical couplers 24q and 24r. Moreover, single carrier optical path transponders 25h are connected with optical couplers (not illustrated) connected with ports other than those currently connected in the drawing among the ports p1 to p8 of the AWGs 24c to 24f.

Figure 12:
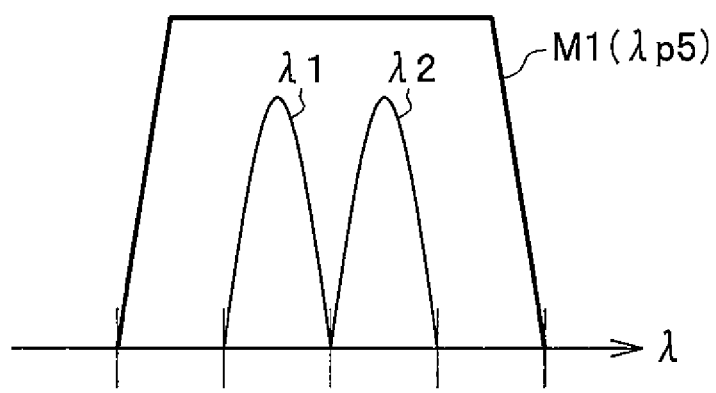
FIG. 12 is a diagram illustrating the wavelength of a multi carrier optical signal output from a multi carrier optical path transponder.

A multi carrier optical signal M1 of a wavelength λp5 in which an optical signal of the wavelength λ1 and an optical signal of the wavelength λ2 illustrated in FIG. 12 are superimposed is transmitted from the two transmission ports p11 and p12 of the multi carrier optical path transponder 25f. The transmitted multi carrier optical signal M1 is input to the port p1 of the AWG 24c of the add function through the optical couplers 24s and 24t. After the input, the multi carrier optical signal M1 is output from the port p0 of the AWG 24c and transmitted through the WSS 23c to the optical fiber 12 in the direction of the arrow Y1.

A multi carrier optical signal (refer to the multi carrier optical signal M1 in FIG. 12) bifurcated at the optical coupler 23a on the optical fiber 13 side is input to the port p0 of the AWG 24d of the drop function and input to from the port p1 to the reception ports p13 and p14 of the transponder 25f through the optical coupler 24t.

For example, a single carrier optical signal (not illustrated) of the wavelength λ3 is transmitted from a transmission port of each single carrier optical path transponder 25h and input to a port of the AWG 24c of the drop function other than the multi carrier optical path through an optical coupler. A single carrier optical signal bifurcated at the optical coupler 23a on the optical fiber 13 side is input to a reception port of the transponder 25f through the AWG 24d and then through the optical coupler 24t.

In addition, a multi carrier optical signal M2 (refer to the multi carrier optical signal M1 in FIG. 12) in which two optical signals (not illustrated) of wavelengths λ41 and λ42 are superimposed may be transmitted from the two transmission ports p11 and p12 of the transponder 25f. In this case, the transmitted multi carrier optical signal M2 is input to the port p4 of the other AWG 24e of the add function through the optical coupler 24s. After the input, the multi carrier optical signal M2 can be transmitted from the AWG 24e through the WSS 23b to the optical fiber 13 in the direction of the arrow Y2.

In this manner, the single carrier optical path and the multi carrier optical path can be provided in mixture.

A multi carrier optical signal M3 in which optical signals of the four wavelengths λ1 to λ4 (not illustrated) are superimposed can be transmitted from the four transmission ports p21 to p24 of the other multi carrier optical path transponder 25g. The transmitted multi carrier optical signal M3 is input to the port p1 of the AWG 24e through the optical couplers 24q and 24j. After the input, the multi carrier optical signal M3 is output from the port p0 of the AWG 24e and transmitted through the WSS 23b to the optical fiber 13 in the direction of the arrow Y2.

In this manner, a signal (refer to the multi carrier optical signal M3) of a large number of wavelengths can be input to a port of an identical AWG (refer to the AWG 24e) by transmitting the multi carrier optical signal M3 in which optical signals of the four wavelengths λ1 to λ4 are superimposed, and thus large-volume data transmission can be performed through one path.

Alternatively, a multi carrier optical signal M4 in which optical signals of the two wavelengths λ1 and λ2 (not illustrated) are superimposed may be transmitted from the two ports p21 and P22 among the four transmission ports p21 to p24 of the transponder 25g, and a multi carrier optical signal M5 in which optical signals of the two wavelengths λ41 and λ42 (not illustrated) are superimposed may be transmitted from the other two ports p23 and P24.

In this case, the multi carrier optical signal M4 is input from the optical coupler 24j to the port p1 of the AWG 24e after passing through the optical coupler 24q, and the multi carrier optical signal M5 is input to the port p4 of the other AWG 24c. The multi carrier optical signal M4 input to the AWG 24e is transmitted through the WSS 23b to the optical fiber 13 in the direction of the arrow Y2. The multi carrier optical signal M5 input to the AWG 24c is transmitted through the WSS 23c to the optical fiber 12 in the direction of the arrow Y1.

In this manner, when the number of optical signals superimposed in each of the multi carrier optical signals M4 and M5 are reduced and the multi carrier optical signals M4 and M5 are transmitted in opposite directions through the different optical fibers 12 and 13, data transmission can be performed through both systems.

Other specific configurations may be modified as appropriate without departing from the scope of the present invention.

REFERENCE SIGNS LIST 10 light transmission system
11a, 11b, 11c, 11d node
12, 13 optical fiber
15 monitoring control device
15a NBI
15b SBI
15c path calculation unit
15d DB
16 higher-level device
21 monitoring control unit
22a, 22b optical amplifier
23 optical SW unit
24 add/drop unit
24a, 24e, 24c1 AWG (add unit)
24b, 24f AWG
23a, 23b, 24c, 24h, 24i, 24j, 24k, 24q, 24r optical coupler
25a, 25b, . . . , 25n transponder
31a, 31b, . . . , 31n communication terminal

The invention claimed is:

1. An optical add/drop multiplexer configured to drop or add an optical signal between the optical add/drop multiplexer and a transponder connected with a communication terminal, the optical signal being transmitted by wavelength division multiplexing to a light transmission path included in multiple different light transmission paths of a communication network, the optical add/drop multiplexer comprising:
an arrayed waveguide grating (AWG), included in a plurality of AWGs, connected between the light transmission path and the transponder included in a plurality of transponders, and configured to output, from a port to the transponder, an optical signal transmitted through the light transmission path and transmit, through a port to the light transmission path, the optical signal transmitted from the transponder;
an optical switch (SW) configured to transmit or cut off, an optical signal between the light transmission path and the AWG; and
an optical coupler configured to connect a plurality of ports of the AWG to the transponder through coupling or bifurcation, wherein the optical coupler is an N×N optical coupler that includes ports connectable with the plurality of ports of the AWG and includes ports connectable with the plurality of the transponders,
wherein a channel interval of ports of the AWG is a plurality of times larger than a channel interval of ports of the transponder, and transponder signals as optical signals of a plurality of different wavelengths to and from one or the plurality of transponders can pass through ports of the AWG, and
wherein when the plurality of AWGs and the plurality of transponders are provided and the communication network includes the multiple different light transmission paths, the optical SW is configured to transmit, to the multiple different light transmission paths, optical signals including transponder signals having an identical wavelength, transmitted from different transponders included in the plurality of transponders, and having passed through different AWGs included in the plurality of AWGs.

2. The optical add/drop multiplexer according to claim 1, wherein:
when the wavelength of a transponder signal at the transponder is changed to a different wavelength, the optical SW is configured to transmit the transponder signal of the changed wavelength to the different light transmission path.

3. The optical add/drop multiplexer according to claim 1, further comprising, between the optical coupler and the transponder:
an amplifier connected with the optical coupler; and
a 1×N optical coupler that includes a port connected with the amplifier and includes ports connectable with a plurality of the transponders.

4. The optical add/drop multiplexer according to claim 2, wherein
the optical SW includes a wavelength selective switch (WSS) configured to perform multiplexing-demultiplexing of the wavelength of an optical signal transmitted to the light transmission path and path switching of the optical signal, and
the WSS is connected to a first pair of a first AWG and a first optical coupler, and a second pair of a second AWG and a second optical coupler, wherein the first pair and the second pair are in parallel with each other.

5. The optical add/drop multiplexer according to claim 1, further comprising, between the optical coupler and the transponder:
an amplifier connected with the optical coupler; and
a 1×N optical coupler that includes a port connected with the amplifier and includes ports connectable with a plurality of the transponders,
wherein a multi carrier optical path transponder including a plurality of transmission ports and a plurality of reception ports is connected with N ports of the 1×N optical coupler, and a single carrier optical path transponder is connected with the optical coupler or a 1×N optical coupler.

6. A light transmission system comprising:
an optical add/drop multiplexer configured to drop or add an optical signal between the optical add/drop multiplexer and a transponder connected with a communication terminal, the optical signal being transmitted by wavelength division multiplexing to a light transmission path included in multiple different light transmission paths of a communication network, the optical add/drop multiplexer comprising:
an arrayed waveguide grating (AWG), included in a plurality of AWGs, connected between the light transmission path and the transponder included in a plurality of transponders, and configured to output, from a port to the transponder, an optical signal transmitted through the light transmission path and transmit, through a port to the light transmission path, the optical signal transmitted from the transponder;
an optical switch (SW) configured to transmit or cut off, an optical signal between the light transmission path and the AWG; and
an optical coupler configured to connect a plurality of ports of the AWG to the transponder through coupling or bifurcation, wherein the optical coupler is an N×N optical coupler that includes ports connectable with the plurality of ports of the AWG and includes ports connectable with the plurality of the transponders, wherein a channel interval of ports of the AWG is a plurality of times larger than a channel interval of ports of the transponder, and transponder signals as optical signals of a plurality of different wavelengths to and from one or the plurality of transponders can pass through ports of the AWG, and wherein when the plurality of AWGs and the plurality of transponders are provided and the communication network includes the multiple different light transmission paths, the optical SW is configured to transmit, to the multiple different light transmission paths, optical signals including transponder signals having an identical wavelength, transmitted from different transponders included in the plurality of transponders, and having passed through different AWGs included in the plurality of AWGs; and a monitoring control device separately connected with the optical add/drop multiplexer and configured to instruct optical path generation control and wavelength change control to the optical add/drop multiplexer, wherein the optical add/drop multiplexer is configured to perform the instructed optical path generation control and wavelength change control to generate an optical path and change the wavelength of an optical signal in the optical add/drop multiplexer.

7. The light transmission system according to claim 6, wherein:

when the wavelength of a transponder signal at the transponder is changed to a different wavelength, the optical SW is configured to transmit the transponder signal of the changed wavelength to the different light transmission path.

8. The light transmission system according to claim 7, wherein the optical SW includes a wavelength selective switch (WSS) configured to perform multiplexing-demultiplexing of the wavelength of an optical signal transmitted to the light transmission path and path switching of the optical signal, and the WSS is connected to a first pair of a first AWG and a first optical coupler, and a second pair of a second AWG and a second optical coupler, wherein the first pair and the second pair are in parallel with each other.

9. The light transmission system according to claim 6, further comprising, between the optical coupler and the transponder:

an amplifier connected with the optical coupler; and a 1×N optical coupler that includes a port connected with the amplifier and includes ports connectable with a plurality of the transponders.

10. The light transmission system according to claim 6, further comprising, between the optical coupler and the transponder:

an amplifier connected with the optical coupler; and a 1×N optical coupler that includes a port connected with the amplifier and includes ports connectable with a plurality of the transponders, wherein a multi carrier optical path transponder including a plurality of transmission ports and a plurality of reception ports is connected with N ports of the 1×N optical coupler, and a single carrier optical path transponder is connected with the optical coupler or a 1×N optical coupler.

* * * * *